(12) United States Patent
Adique et al.

(10) Patent No.: US 10,669,892 B2
(45) Date of Patent: Jun. 2, 2020

(54) OIL FILTERING SYSTEM

(71) Applicant: PRATT & WHITNEY CANADA CORP., Longueuil (CA)

(72) Inventors: Marc Jordan Adique, Brampton (CA); John Adam Logan, Toronto (CA)

(73) Assignee: PRATT & WHITNEY CANADA CORP., Longueuil (CA)

( * ) Notice: Subject to any disclaimer, the term of this patent is extended or adjusted under 35 U.S.C. 154(b) by 282 days.

(21) Appl. No.: 15/712,947

(22) Filed: Sep. 22, 2017

(65) Prior Publication Data

US 2019/0093509 A1    Mar. 28, 2019

(51) Int. Cl.
| | |
|---|---|
| *F01D 25/20* | (2006.01) |
| *F01D 25/14* | (2006.01) |
| *F16N 7/40* | (2006.01) |
| *F02C 3/14* | (2006.01) |
| *F01M 1/10* | (2006.01) |
| *F02C 3/10* | (2006.01) |

(Continued)

(52) U.S. Cl.
CPC ............. *F01D 25/20* (2013.01); *B01D 29/52* (2013.01); *F01D 25/14* (2013.01); *F01M 1/10* (2013.01); *F01M 5/002* (2013.01); *F02C 3/10* (2013.01); *F02C 3/145* (2013.01); *F16N 7/40* (2013.01); *F16N 39/02* (2013.01); *F16N 39/06* (2013.01); *F01M 2001/1057* (2013.01); *F05D 2260/607* (2013.01); *F16N 2210/02* (2013.01)

(58) Field of Classification Search
CPC ......... F01D 25/20; F01D 25/14; F01M 11/03; F01M 2001/1007; F01M 2001/1092; F01M 2011/033; F01M 1/10; F01M 5/001; F01M 5/002; F01M 5/005; F01M 2250/60; F16N 7/40; F16N 39/02; F16N 39/06; F16N 2210/02; B01D 29/0047; B01D 29/005; B01D 29/0056; B01D 29/60; B01D 29/603; B01D 29/606; B01D 35/005; B01D 35/147; B01D 35/1475; B01D 35/157; B01D 35/1573; B01D 36/00; B01D 37/04; B01D 37/046; B01D 2201/56; B01D 2201/167; F02C 3/10; F02C 3/1415
See application file for complete search history.

(56) References Cited

U.S. PATENT DOCUMENTS

| | | | |
|---|---|---|---|
| 4,174,699 A | 11/1979 | Gill | |
| 4,512,299 A * | 4/1985 | Egan | ........................ F01M 1/10 123/196 A |

(Continued)

*Primary Examiner* — Michael R Mansen
*Assistant Examiner* — Robert T Reese
(74) *Attorney, Agent, or Firm* — Alexandre Daoust; Norton Rose Fulbright Canada LLP

(57) ABSTRACT

An oil filtering system comprises: a first inlet, a first outlet, and a first oil filter; a first bypass conduit interconnecting the first inlet to the first outlet; a first valve in the first bypass conduit, the first inlet fluidly connected to the first outlet at least via the first bypass conduit in an opened configuration of the first valve, and via the first oil filter in a closed configuration; a second inlet, a second outlet, and a second oil filter; a second bypass conduit between the first inlet and the second outlet; a second valve disposed in the second bypass conduit, the second outlet fluidly connected to the first inlet via the second bypass conduit in an open configuration of the second valve, and via the second oil filter in the closed configuration thereof.

11 Claims, 2 Drawing Sheets

(51) Int. Cl.
    *F16N 39/02* (2006.01)
    *F16N 39/06* (2006.01)
    *F01M 5/00* (2006.01)
    *B01D 29/52* (2006.01)

(56) References Cited

U.S. PATENT DOCUMENTS

| | | | | |
|---|---|---|---|---|
| 5,298,158 | A * | 3/1994 | Anderson | B01D 35/12 210/167.04 |
| 6,126,818 | A * | 10/2000 | Duerrstein | B01D 35/12 210/132 |
| 6,592,047 | B1 * | 7/2003 | Staley | F01M 1/16 137/73 |
| 6,695,659 | B2 * | 2/2004 | Kolb | B63H 20/002 123/196 A |
| 9,062,575 | B2 * | 6/2015 | Apostolides | F01M 11/0408 |
| 2015/0184802 | A1 * | 7/2015 | Leising | F01M 5/002 184/6.22 |
| 2018/0230854 | A1 * | 8/2018 | Parnin | F01D 25/18 |

* cited by examiner

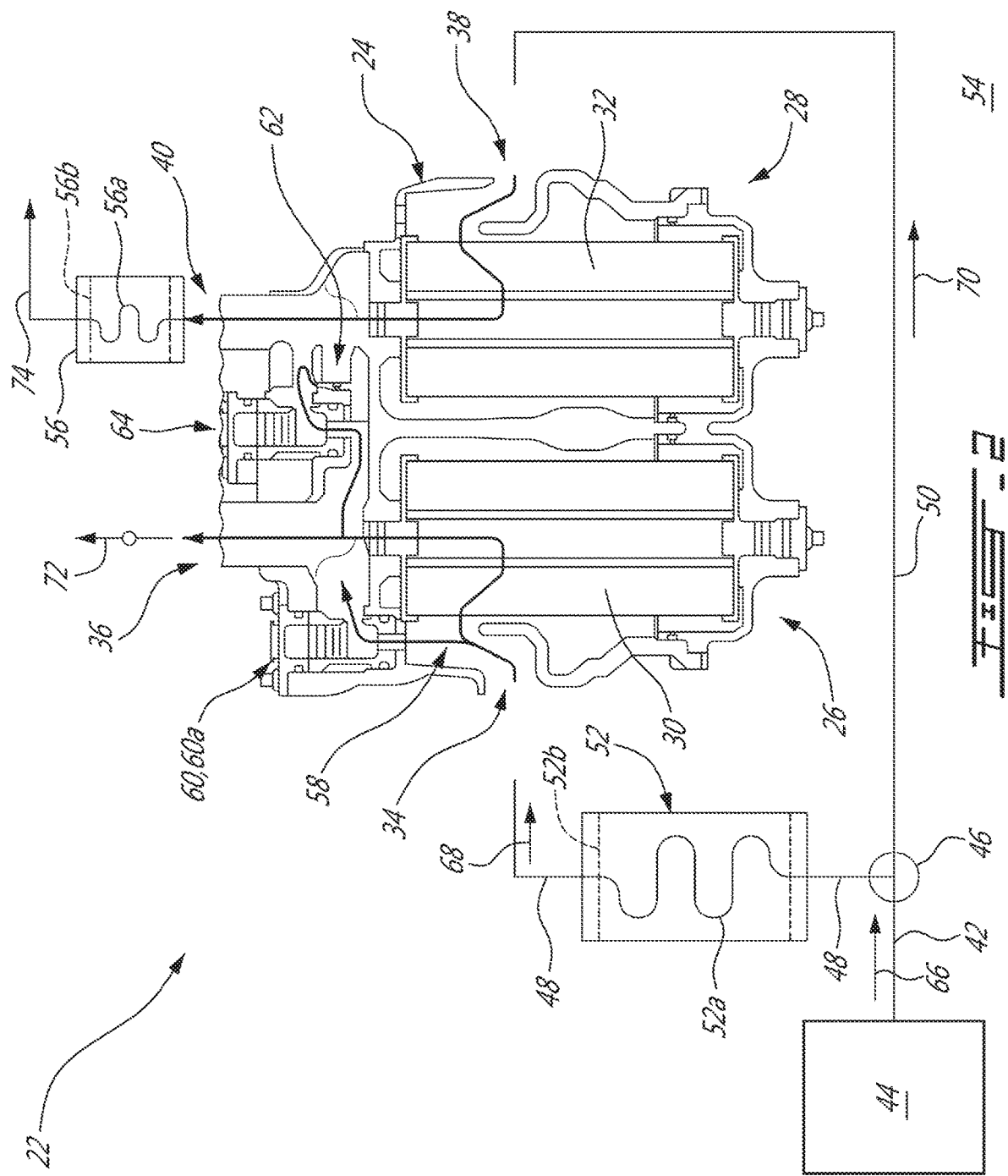

OIL FILTERING SYSTEM

TECHNICAL FIELD

The application relates generally to gas turbine engines and, more particularly, to systems and methods used to filter lubricating oil circulating in such engines.

BACKGROUND OF THE ART

A gas turbine engine typically has several components which require constant lubrication for proper operation. For instance, the compressor and the turbine rotate within a casing via bearings which are constantly lubricated. Gas turbine engines typically also include at least one gearbox which constantly requires lubrication. An oil recirculation system is used to scavenge and recirculate the oil. The oil recirculation system can include a plurality of circuits leading to different components. Typically, components all require filtered oil, but the temperature requirements may vary from one component to another. One or more heat exchangers can be used to exchange heat with the oil. Although known systems were satisfactory to a certain degree, there remained room for improvement.

SUMMARY

In accordance with one aspect, there is provided an oil filtering system comprising: a first filtering section having a first inlet, a first outlet, a first oil filter disposed between the first inlet and the first outlet, a first bypass conduit interconnecting the first inlet to the first outlet, a first valve in the first bypass conduit, the first valve having a closed configuration and an opened configuration, the first inlet fluidly connected to the first outlet at least via the first bypass conduit in the opened configuration of the first valve, and via the first oil filter in the closed configuration of the first valve, and a monitoring sensor; a second filtering section having a second inlet, a second outlet, a second oil filter disposed between the second inlet and the second outlet, a second bypass conduit between the first inlet and the second outlet, a second valve disposed in the second bypass conduit, the second valve having a closed configuration and an opened configuration, the second outlet fluidly connected to the first inlet via the second bypass conduit in the open configuration of the second valve, and via the second oil filter in the closed configuration of the second valve; and a heat exchanger having a first conduit and a second conduit, the first and second conduits being in heat exchange relationship with each other, the second conduit circulating a fluid coolant for decreasing a temperature of oil circulating in the first conduit, the first conduit being connected to one of the first inlet and the second inlet.

In accordance with another aspect, there is provided a gas turbine engine comprising two components requiring lubrication; an oil circuitry for circulating oil for lubricating the two components; and an oil filtering system in fluid communication with the oil circuitry, the oil filtering system comprising a first filtering section having a first inlet, a first outlet, a first oil filter disposed between the first inlet and the first outlet, the first outlet fluidly connected with a first one of the two components; a first bypass conduit interconnecting the first inlet to the first outlet; a first valve in the first bypass conduit, the first valve having a closed configuration and an opened configuration, the first inlet fluidly connected to the first outlet at least via the first bypass conduit in the opened configuration of the first valve, and via the first oil filter in the closed configuration of the first valve, the first filtering section having a monitoring sensor; a second filtering section having a second inlet, a second outlet, a second oil filter disposed between the second inlet and the second outlet, the second outlet fluidly connected to a second one of the two components; a second bypass conduit between the first inlet and the second outlet; and a second valve disposed in the second bypass conduit, the second valve having a closed configuration and an opened configuration, the second outlet fluidly connected to the first inlet via the second bypass conduit in the open configuration of the second valve, and to the second inlet via the second oil filter in the closed configuration.

In accordance with still another aspect, there is provided a method of operating an oil filtering system comprising a first oil filter and a second oil filter, the method comprising: receiving a first oil flow and a second oil flow to be filtered in a respective one of the first and the second oil filters; directing the first oil flow and the second oil flow through the oil filtering system in accordance with one of four configurations of the oil filtering system; cooling the first oil flow upstream of the oil filtering system; outputting a first output flow of oil and a second output flow of oil, wherein: in a first configuration, the method comprises: filtering the first oil flow in the first oil filter; and filtering the second oil flow in the second oil filter, in a second configuration, the method comprises: directing the first oil flow to bypass the first oil filter; and filtering the second oil flow in the second oil filter, in a third configuration, the method comprises: directing the first and second oil flows toward the first oil filter; filtering a portion of the first and second oil flows in the first oil filter; and directing a remainder of the first and second oil flows to bypass the first oil filter, in a fourth configuration, the method comprises: directing the first and second oil flows toward the first oil filter; and directing the first and second oil flows to bypass the first oil filter; and monitoring the first valve.

In accordance with still another aspect, there is provided an oil filtering system comprising: a first filtering section having a first inlet, a first outlet, a first oil filter disposed between the first inlet and the first outlet, a first bypass conduit interconnecting the first inlet to the first outlet, a first valve in the first bypass conduit, the first valve having a closed configuration and an opened configuration, the first inlet fluidly connected to the first outlet at least via the first bypass conduit in the opened configuration of the first valve, and via the first oil filter in the closed configuration of the first valve, and a monitoring sensor; a second filtering section having a second inlet, a second outlet, a second oil filter disposed between the second inlet and the second outlet, and a second bypass conduit between the first inlet and the second outlet, a second valve disposed in the second bypass conduit, the second valve having a closed configuration and an opened configuration, the second outlet fluidly connected to the first inlet via the second bypass conduit in the open configuration of the second valve, and via the second oil filter in the closed configuration of the second valve.

DESCRIPTION OF THE DRAWINGS

Reference is now made to the accompanying figures in which:

FIG. 2 is a front cross-sectional view of an oil filtering system of the gas turbine engine of FIG. 1.

DETAILED DESCRIPTION

Figure 1:
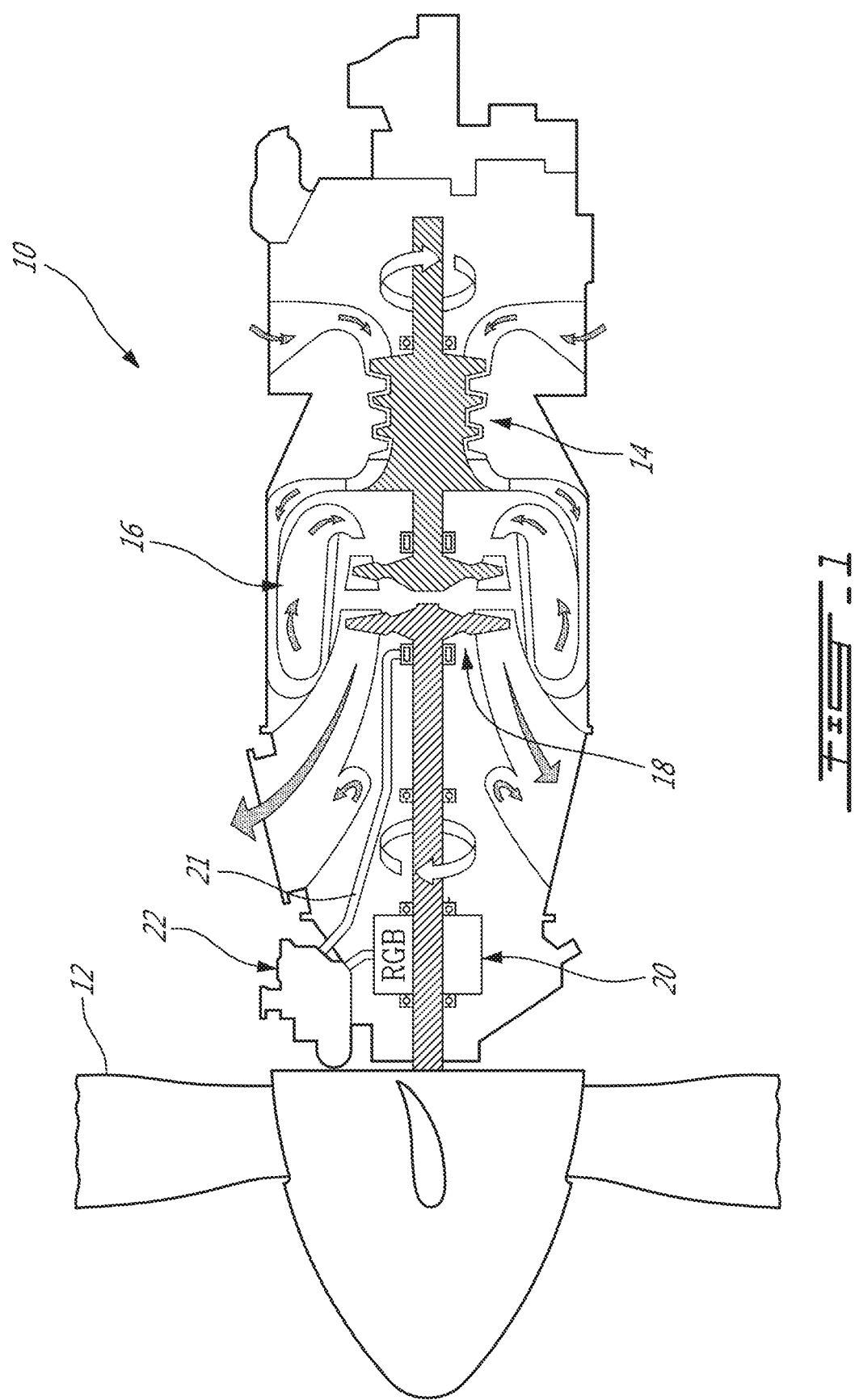
FIG. 1 is a schematic cross-sectional view of a gas turbine engine.

FIG. 1 illustrates a gas turbine engine 10 of a type preferably provided for use in subsonic flight, generally comprising a rotatable load 12 through which ambient air is propelled, a compressor section 14 for pressurizing the air, a combustor 16 in which the compressed air is mixed with fuel and ignited for generating an annular stream of hot combustion gases, and a turbine section 18 for extracting energy from the combustion gases. In the embodiment shown, the rotatable load 12 is a propeller, but may be any suitable load such as, a helicopter rotor, or a fan. The gas turbine engine 10 further comprises a gearbox 20 for creating a rotational speed ratio between the turbine section 18 and the rotatable load 12 drivingly engaged thereto.

Some components of the gas turbine engine 10 require constant lubrication for proper operation. For that matter, the engine 10 includes an oil circuitry 21 and an oil filtering system 22 in fluid communication with the oil circuitry and configured for circulating a flow of oil for lubricating the components of the gas turbine engine 10. In the embodiment shown, the components are the gearbox 20 and the turbine section 18. Although the oil circuitry 21 is illustrated as being fluidly connected to the gearbox 20 and to the turbine section 18, it is understood that the oil circuitry 21 may be fluidly connected to any components of the gas turbine engine 10 that require constant lubrication.

In the embodiment shown, the gearbox 20 requires oil that has a temperature less or equal than 210 degrees Fahrenheit whereas the turbine section 18 requires oil that has a temperature less or equal than 275 degrees Fahrenheit. Hence, it might be advantageous to split a flow of unfiltered oil of the oil circuitry 21 in accordance with the requirements in oil temperature of these two components. It is understood that the aforementioned temperatures are associated with the disclosed embodiment and may be different for other configurations.

Referring now also to FIG. 2, the oil filtering system 22 is disclosed. The oil filtering system 22 comprises a common casing 24 defining a first filtering section 26 and a second filtering section 28. In this specific embodiment, the first filtering section leads to the gearbox 20, and can therefore be referred to as the gearbox branch, and the second filtering section leads to the turbomachinery, and more specifically to the bearing system supporting one or more of the rotating turbomachinery components (e.g. compressor, fan, turbine). The first and second filtering sections 26 and 28 are partitioned from one another within the common casing 24. The first and second filtering sections 26 and 28 include a first oil filter 30 and a second oil filter 32, respectively. The oil filtering system 22 has a first inlet 34 and a first outlet 36 configured to be fluidly connected to the first inlet 34 via the first oil filter 30 through the first filtering section 26. The oil filtering system 22 further has a second inlet 38 and a second outlet 40 configured to be fluidly connected to the second inlet 38 via the second oil filter 32 through the second filtering section 28.

The oil filtering system 22 receives a flow of unfiltered oil through a conduit 42, typically from a pump 44. Then, the flow passes through a splitter 46 where it is divided between the first and the second filtering sections 26 and 28 through a respective one of a first input conduit 48 and a second input conduit 50. In the embodiment shown, a flow of oil circulating in the first input conduit 48 is cooled through a passage in a heat exchanger 52 located downstream of the splitter 44 relative from a flow of unfiltered oil circulating in the first input conduit 48.

In the embodiment shown, the heat exchanger 52 is an Air-Cooled-Oil-Cooler (ACOC) having a first heat exchanger conduit 52a and a second heat exchanger conduit 52b in heat exchange relationship with the first heat exchanger conduit 52a. The first heat exchanger conduit 52a is in fluid communication with the first input conduit 48. In the depicted embodiment, the second heat exchanger conduit 52b receives a flow of ambient air from an environment 54 of the engine 10 to be heated by the flow of oil circulating in the heat exchanger first conduit 52a. The first input conduit 48 resumes downstream of the heat exchanger 52 and is fluidly connected to the first inlet 34 of the oil filtering system 22.

In the depicted embodiment, the heat exchanger 52 is located upstream of the first filtering section 26 relative to an oil flow circulating from the first inlet 34 to the first outlet 36. More specifically, an outlet of the first conduit 52a of the heat exchanger 52 is fluidly connected to the first inlet 34.

In the embodiment shown, filtering the oil with a single filter element upstream of the ACOC was not an option. This can be the case when the ACOC is provided by the air framer for instance, whereas the components downstream of the ACOC are provided by the engine manufacturer.

In the embodiment shown, a flow of unfiltered oil circulating in the second input conduit 50 enters the second filtering section 28 through the second inlet 38 and is filtered through the second oil filter 32 and exits via the second outlet 40. In the embodiment shown, the second outlet 40 is fluidly connected to a fuel heater 56. The fuel heater 56 is configured for receiving a flow of filtered oil from the second filtering section 28 and for cooling said flow of filtered oil before it is fed to the rotating components 12, 14, 18 when required. In the embodiment shown, the fuel heater 56 has a first fuel heater conduit 56a fluidly connected to the second outlet 40 and a second fuel heater conduit 56b configured for receiving fuel to be heated. The first fuel heater conduit 56a and the second fuel heater conduit 56b are in heat exchange relationship with each other. In a particular embodiment, the fuel heater 56 is a fuel oil heat exchanger (FOHE) or a fuel-cooled-oil cooler (FCOC). In the embodiment shown, the heat transfer capability of the heat exchanger 52 is greater than that of the fuel heater 56. Stated otherwise, a temperature variation of an oil flow might be greater following a passage through the heat exchanger 52 than following a passage through the fuel heater 56. Therefore, the fuel heater 56 is disposed on the branch that requires the less cooling, which, in the embodiment shown, corresponds to the second filtering section. The fuel heater 56 is located upstream of the rotating components relative to a flow of oil exiting the oil filtering system 22.

In the illustrated embodiment, the fuel heater 56 is located downstream of the second filtering section 28 relative to an oil flow exiting the second outlet 40. More specifically, an outlet of the first fuel heater conduit 56a of the fuel heater 56 is fluidly connected to the second outlet 40.

In a normal operation mode, the first and second oil filters 30 and 32 are able to receive a respective flow of unfiltered oil and to filtered said oil before it exits the oil filtering system 22. However, at some point, and even though every effort is made to avoid this, it might occur that one, or even both, of the first and the second oil filters 30 and 32 become clogged. In some cases, lubricating the components of the engine 10 with unfiltered oil might be less problematic than totally stopping lubricating the components. Hence, in the embodiment shown, the oil filtering system 10 is configured to allow the oil to bypass the clogged filter(s) when required.

Still referring to FIG. 2, the oil filtering system 10 further includes a first bypass conduit 58 that interconnects the first inlet 34 and the first outlet 36. The system 22 further includes a first valve 60, also referred to as a bypass valve, operatively connected to the first bypass conduit 58 and configured for selectively allow or preclude fluid communication between the first inlet 34 and outlet 36 through the first bypass conduit 58. In the embodiment shown, the first valve 60 is a pressure-based valve that may be biased by a biasing member, such as, for example, a spring. Any suitable valve and/or biasing member may be used without departing from the scope of the present disclosure.

In the embodiment shown, the first valve 60 has a closed configuration and an opened configuration. In the closed configuration, the first inlet 34 is fluidly connected to the first outlet 36 via the first oil filter 30. However, if the first oil filter 30 becomes clogged, or partially clogged, the first valve 60 may shift from the closed configuration to the opened configuration in which the first inlet 34 is fluidly connected to the first outlet 36 at least via the first bypass conduit 58. The first valve 60 is biased in the closed configuration.

In the depicted embodiment, the first valve 60 is monitored and includes a monitoring sensor 60a that is configured to detect whether the first valve 60 is in the opened or the closed configurations. The monitoring sensor 60a is then able to send a signal to notify a user of the engine (e.g. a pilot) that there may be a problem with at least one of the oil filters 30 and/or 32 of the oil filtering system 22. However, valves that include monitoring circuits are typically expensive. Therefore, it might be advantageous to have only one of such valves that is configured to monitor both the first and the second oil filters 30 and 32. In the embodiment shown, the monitoring sensor 60a is able to monitor a pressure differential (a pressure drop between the first inlet and outlet), in real time so that it can indicate when the first valve 60 will imminently open. Stated otherwise, the monitoring sensor 60a may indicate the user that the first valve 60 is about to switch to the opened configuration to allow the flow of oil to bypass the first filter. In another embodiment, the monitoring sensor can be a simpler device, such as a switch or proximity sensor which detects when the first valve has open.

Still referring to FIG. 2, the oil filtering system 22 further includes a second bypass conduit 62 extending between the first and the second filtering sections 26 and 28, more specifically between the first inlet 34 and the second outlet 40. A second valve 64, also referred to as a check valve, is disposed in the second bypass conduit 62 for controlling a flow of oil that circulates therein. The second valve 64 has a closed configuration and an opened configuration. In the closed configuration, the second inlet 38 is fluidly connected to the second outlet 40 through the second oil filter 32. In the opened configuration, the second outlet 40 is in fluid communication with the first inlet 34 of the oil filtering system 22. The second valve 64 is biased in the closed configuration.

In the embodiment shown, and when the first oil filter 30 is not clogged, the flow pressure between the first inlet 34 and the first outlet 36 defines a first predetermined pressure differential. When the first oil filter 30 becomes clogged, the pressure differential between the first inlet and outlet 34 and 36 increases because the flow is unable to pass through the first oil filter 30. Hence, when the pressure differential between the first inlet 34 and the first outlet 36 exceeds a first threshold, the first valve 60 switches from the closed configuration toward the opened configuration and allows the flow of unfiltered oil to pass through the first by pass conduit 58. At which point, the sensor 60a notifies the user of a problem with the oil filtering system 10.

When both the first and second oil filters 30 and 32 are not clogged, the flow pressure in the first filtering section 26 is less than that of the second filtering section 28 and defines a second predetermined pressure differential. Stated otherwise, the second pressure differential is defined between the second outlet 40 and the first inlet 34. This pressure differential keeps the second valve 64 in the closed configuration. If the second oil filter 32 becomes clogged, the pressure in the second oil filtering section 28 downstream of the second oil filter 32 decreases because no oil is exiting the second oil filter 32. The pressure differential between the first and second oil filtering sections 26 and 28 shifts away from the second predetermined pressure differential. Hence, when the pressure differential between the first inlet 34 and the second outlet 40 exceeds a second threshold, the second valve 64 switches from the closed configuration to the opened configuration.

When the second oil filter 32 is clogged, the flow of unfiltered oil circulating in the conduit 42 passes in the splitter 46, but is all directed in the first input conduit 48 because no flow can circulate in the second input conduit 50. Therefore, all of the flow of unfiltered oil circulates through the first filtering section 26. A pressure differential between the first inlet and outlet 34 and 36 increases in such a way that the first valve 60 might switch from the closed configuration to the opened configuration because the first oil filter 30 might be unable to cater to such a flow of oil. The monitoring sensor 60a of the first valve 60 notifies the user of an increase in the pressure drop and that it might soon be switched toward the opened configuration. The sensor 60a indicates that at least one of the oil filters 30 and/or 32 has problem. The flow of oil is then divided in two downstream of the first oil filter 30 relative to a flow direction circulating therein and annotated by the arrows on FIG. 2. A first portion of the flow exits the first filtering section 26 via the first outlet 36 whereas a second portion of the flow exits the second filtering section 28 via the second outlet 40.

In the embodiment shown, whether the first and/or the second oil filters 30 and/or 32 becomes clog, the gearbox 20 always receives oil that has been cooled through the heat exchanger 52 to meet the more restricted temperature requirement relative to that of the rotating components.

In a particular embodiment, the size of the heat exchanger 52 (e.g. Air-Cooled-Oil-Cooler) is reduced because the quantity of oil that it must cater to is reduced compared with a configuration in which the heat exchanger must cater to all of the oil of the oil circuitry 21. In a particular embodiment, weights savings are obtained. In a particular embodiment, the size of the fuel heater 56 is minimized because it only caters to a portion of the flow, because less heat transfer is required since higher outlet temperature are acceptable on the turbomachinery branch, and because the fuel heater 56 receives filtered oil that allows using smaller oil conduits since less particles susceptible to clog said conduits are present in filtered oil comparted to unfiltered oil. In a particular embodiment, the oil filtering system 10 allows for the relief of heat exchange element performance requirements compared to a system in which the heat exchanger cools all of the oil. In a particular embodiment, having the two oil filters 30 and 32 in a single location facilitates maintenance and replacement of the different components of the oil filtering system 22.

In a particular embodiment, further to reducing costs because only one of the first and the second valve 60 and 64 includes a sensor 60a, the oil filtering system 22 creates a redundancy; if one of the filters gets clogged, the oil flow, or a portion thereof, that was supposed to be filtered by the second oil filter 32 might be filtered by the first oil filter.

In a particular embodiment, the second valve 64 is replaced by a bypass valve including a monitoring circuit and disposed in a bypass conduit fluidly connected with the second filtering section 28 and fluidly disconnected from the first filtering section 26. Stated otherwise, in such a particular embodiment, the second filtering section 28 comprises a bypass conduit similar to that of the first filtering section 26.

Still referring to FIGS. 1 and 2, for operating the oil filtering system 22, an incoming flow 66 is divided in a first 68 and a second 70 oil flows to be filtered in a respective one of the first and the second oil filters 30 and 32. Then, the first and second oil flows 68 and 70 are directed through the oil filtering system in accordance with one of four possible configurations of the oil filtering system 22 that are describe herein below. Then, a first output flow 72 and a second output flow 74 are outputted from the oil filtering system 22 through the first and second outlets 36 and 40, respectively.

In a first configuration of the four possible configurations, the first oil flow 68 is directed toward the first oil filter 30 via the first input conduit 48 to be filtered in the first oil filter 30. Similarly, the second oil flow 70 is directed toward the second oil filter 32 via the second input conduit 50 to be filtered in the second oil filter 32. As aforementioned, the first and the second input conduit 48 and 50 are fluidly connected to the first and second inlets 34 and 38, respectively.

In a second configuration of the four possible configurations, the first oil flow 68 is rerouted to bypass the first oil filter 30 and the second oil flow 70 is filtered in the second oil filter 32. More specifically, the first oil flow 68 is directed in the first bypass conduit 58 to bypass the first oil filter 30. The second configuration is selected typically when the first oil filter 30 is clogged which causes the first valve 60 to open following a variation in the pressure differential between the first inlet 34 and the first outlet 36.

In a third configuration of the four possible configurations, a totality of the incoming flow 66 is directed toward the first filtering section 26 through the first input conduit 48. Then, a portion of the incoming flow 66 is filtered in the first oil filter 30 and a remainder of the incoming flow 66 is directed in the first bypass conduit 58 to bypass the first oil filter 30. The third configuration is selected typically when the second oil filter 32 is clogged which causes the second valve 64 to open following a variation in the pressure differential between the first and the second filtering sections 26 and 28. In the third configuration, the first filtering section 26 is configured to divide the flow downstream of the first oil filter 30 to create the first and the second output flows 72 and 74.

In a fourth configuration, the totality of the incoming flow 66 is directed toward the first filtering section 26 through the first input conduit 48 and directed to bypass the first oil filter 30. Then, the incoming oil flow 66, which has not been filtered, is divided in two downstream of the first oil filter 30. The fourth configuration is selected typically when both of the first and the second oil filters 30 and 32 are clogged. In the fourth configuration, the first filtering section 26 is configured to divide the flow downstream of the first oil filter 30 to create the first and the second output flows 72 and 74.

In the depicted embodiment, the first oil flow 68 is cooled before being received in the first filtering section 26 and the second output flow 74 is cooled downstream of the second filtering section 28. In the embodiment shown, the second output flow 74 is cooled by transferring heat therefrom toward a flow of fuel to be heated. In the embodiment shown, when the oil filtering system 22 is about to switch toward any one of the second, third, and fourth configurations, a signal is emitted to notify the user that a problematic with at least one of the oil filters 30 and/or 32 is imminent.

In summary system can have two filter lines each having its dedicated filter. Each filter is bypassable to provide for the possibility that it gets clogged. In one embodiment, this is achieved by providing a bypass valve in the first line allowing the first filter to be bypassed. A second bypass valve is provided between the outlets of the first and second filter lines. If the second filter gets clogged, the fluid gets redirected through the first filter line, across both the first bypass valve and the second bypass valve.

Using the two filter lines instead of a single one can allow to have two different outlet temperature requirements, by cooling the fluid differently in the two lines upstream of the corresponding filters, and thereby limit the amount of excessive cooling. Alternately, or simultaneously, using two filter lines instead of a single one can allow to have filtration redundancy (i.e. the clogged filter's flow can be diverted to the other filter line and possibly be at least partially filtered, rather than having a single filter which is entirely bypassed if it gets clogged). Indeed, even without heat exchanger, it may be advantageous to provide a system which has this general configuration in view of the filtration redundancy it offers.

Using the second bypass between the two outlets, rather than in the second filter line, can avoid providing double monitoring to the bypass valves while still providing a signal when something is wrong with any one of the filters. For instance, the first bypass valve can be monitored, while the second one is not. If the second filter gets clogged, the first bypass valve will be triggered by the increase in pressure stemming from the fluid diverted from the second filter line before triggering the second bypass valve, and a fault indication can be provided regardless of which filter becomes clogged. In this example, the system does not allow to identify which one of the filters is clogged, only that at least one of the filters is clogged, which can be sufficient in some embodiments.

The above description is meant to be exemplary only, and one skilled in the art will recognize that changes may be made to the embodiments described without departing from the scope of the invention disclosed. Still other modifications which fall within the scope of the present invention will be apparent to those skilled in the art, in light of a review of this disclosure, and such modifications are intended to fall within the appended claims.

The invention claimed is:
1. An oil filtering system comprising:
a first filtering section having a first inlet, a first outlet, a first oil filter disposed between the first inlet and the first outlet, a first bypass conduit interconnecting the first inlet to the first outlet, a first valve in the first bypass conduit, the first valve having a closed configuration and an opened configuration, the first inlet fluidly connected to the first outlet at least via the first bypass conduit in the opened configuration of the first valve, and via the first oil filter in the closed configuration of the first valve, and a monitoring sensor;

a second filtering section having a second inlet, a second outlet, a second oil filter disposed between the second inlet and the second outlet, a second bypass conduit between the first inlet and the second outlet, a second valve disposed in the second bypass conduit, the second valve having a closed configuration and an opened configuration, the second outlet fluidly connected to the first inlet via the second bypass conduit in the open configuration of the second valve, and via the second oil filter in the closed configuration of the second valve; and a heat exchanger having a first conduit and a second conduit, the first and second conduits being in heat exchange relationship with each other, the second conduit circulating a fluid coolant for decreasing a temperature of oil circulating in the first conduit, the first conduit being connected to one of the first inlet and the second inlet.

2. The oil filtering system of claim 1, wherein the monitoring sensor is configured to monitor a pressure differential between the first inlet and the first outlet.

3. The oil filtering system of claim 1, wherein the first and the second filtering sections are within a common casing and are partitioned from one another.

4. The oil filtering system of claim 1, wherein the first and second valves are biased in their respective closed configurations, the first valve switches to the opened configuration if a pressure differential between the first inlet and the first outlet exceeds a first threshold, the second valve switches to the opened configuration if a pressure differential between the second outlet and the first inlet exceeds a second threshold.

5. The oil filtering system of claim 1, wherein the fluid coolant is ambient air.

6. The oil filtering system of claim 1, further comprising a fuel heater having a first fuel heater conduit fluidly connected to the second filtering section and a second fuel heater conduit configured for receiving fuel to be heated, the first fuel heater conduit and the second fuel heater conduit in heat exchange relationship with each other.

7. The oil filtering system of claim 6, wherein the fuel heater is disposed downstream of the second filtering section relative to an oil flow exiting the second inlet.

8. The oil filtering system of claim 1, further comprising a splitter for dividing an incoming flow of oil, the splitter having two outlets, one of the two outlets fluidly connected to the first inlet, the other of the two outlets fluidly connected to the second inlet.

9. A method of operating an oil filtering system comprising a first oil filter and a second oil filter, the method comprising:

receiving a first oil flow and a second oil flow to be filtered in a respective one of the first and the second oil filters;

directing the first oil flow and the second oil flow through the oil filtering system in accordance with one of four configurations of the oil filtering system;

cooling the first oil flow upstream of the oil filtering system;

outputting a first output flow of oil and a second output flow of oil, wherein:
  in a first configuration, the method comprises:
    filtering the first oil flow in the first oil filter; and
    filtering the second oil flow in the second oil filter,
  in a second configuration, the method comprises:
    directing the first oil flow to bypass the first oil filter; and
    filtering the second oil flow in the second oil filter,
  in a third configuration, the method comprises:
    directing the first and second oil flows toward the first oil filter;
    filtering a portion of the first and second oil flows in the first oil filter; and
    directing a remainder of the first and second oil flows to bypass the first oil filter,
  in a fourth configuration, the method comprises:
    directing the first and second oil flows toward the first oil filter; and
    directing the first and second oil flows to bypass the first oil filter; and
  monitoring the first valve.

10. The method of claim 9, further comprising cooling the second output flow downstream of the second oil filter.

11. The method of claim 9, wherein said monitoring the first valve further comprises measuring a pressure differential across the first valve and generating a signal indicative of said measured pressure differential.

* * * * *